Inventors:
HERBERT ERWIEN and
WATHER KAISER
by
Arthur O. Klein
their Attorney

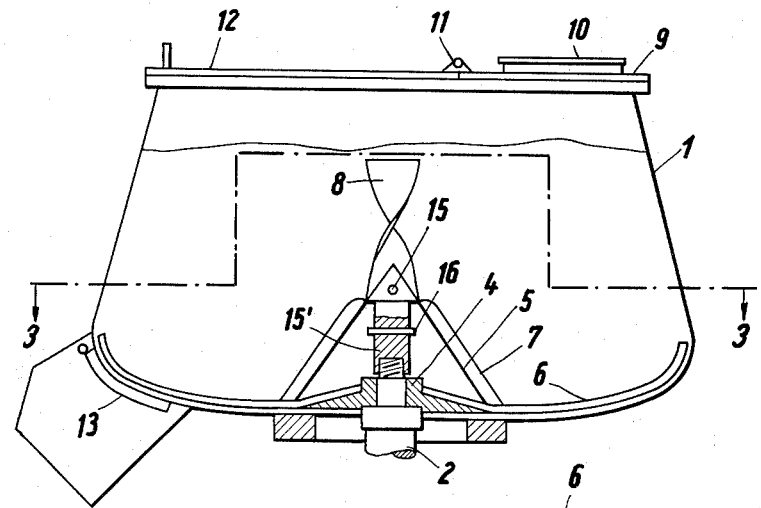
Fig. 2
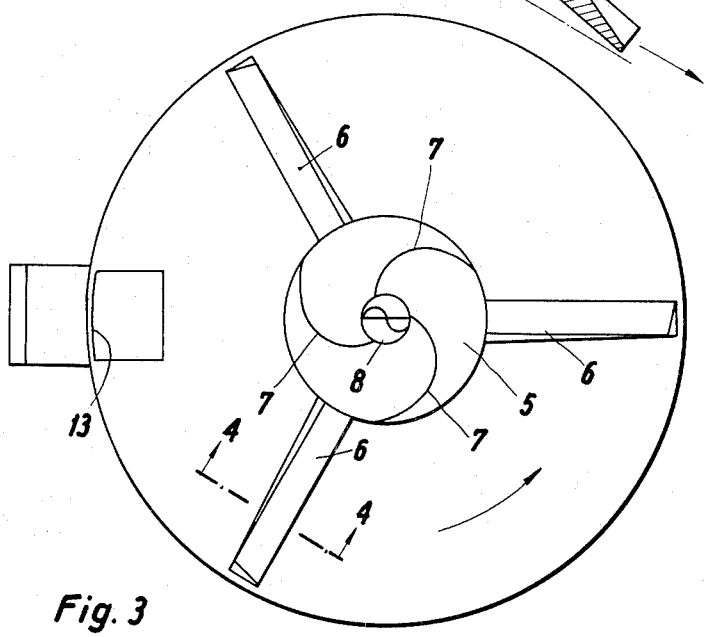
Fig. 4
Fig. 3

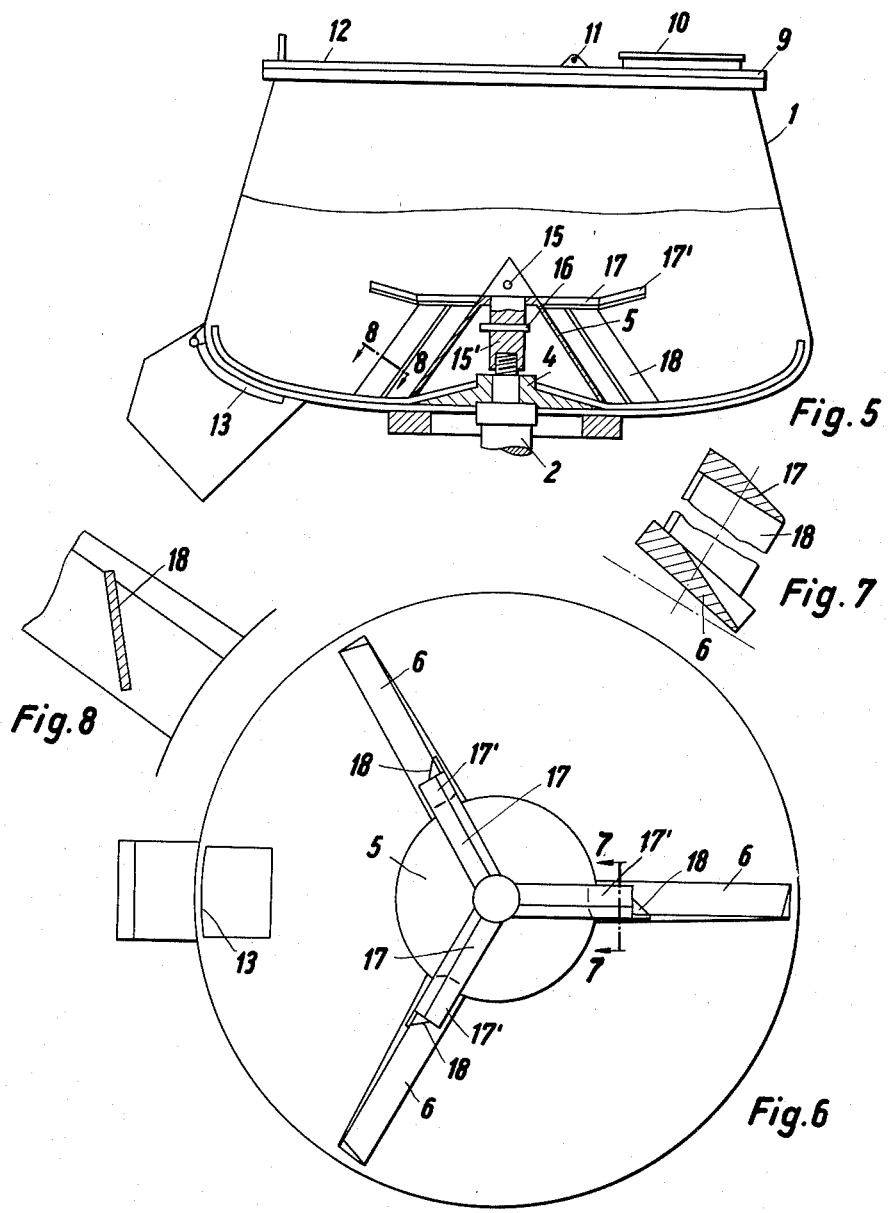

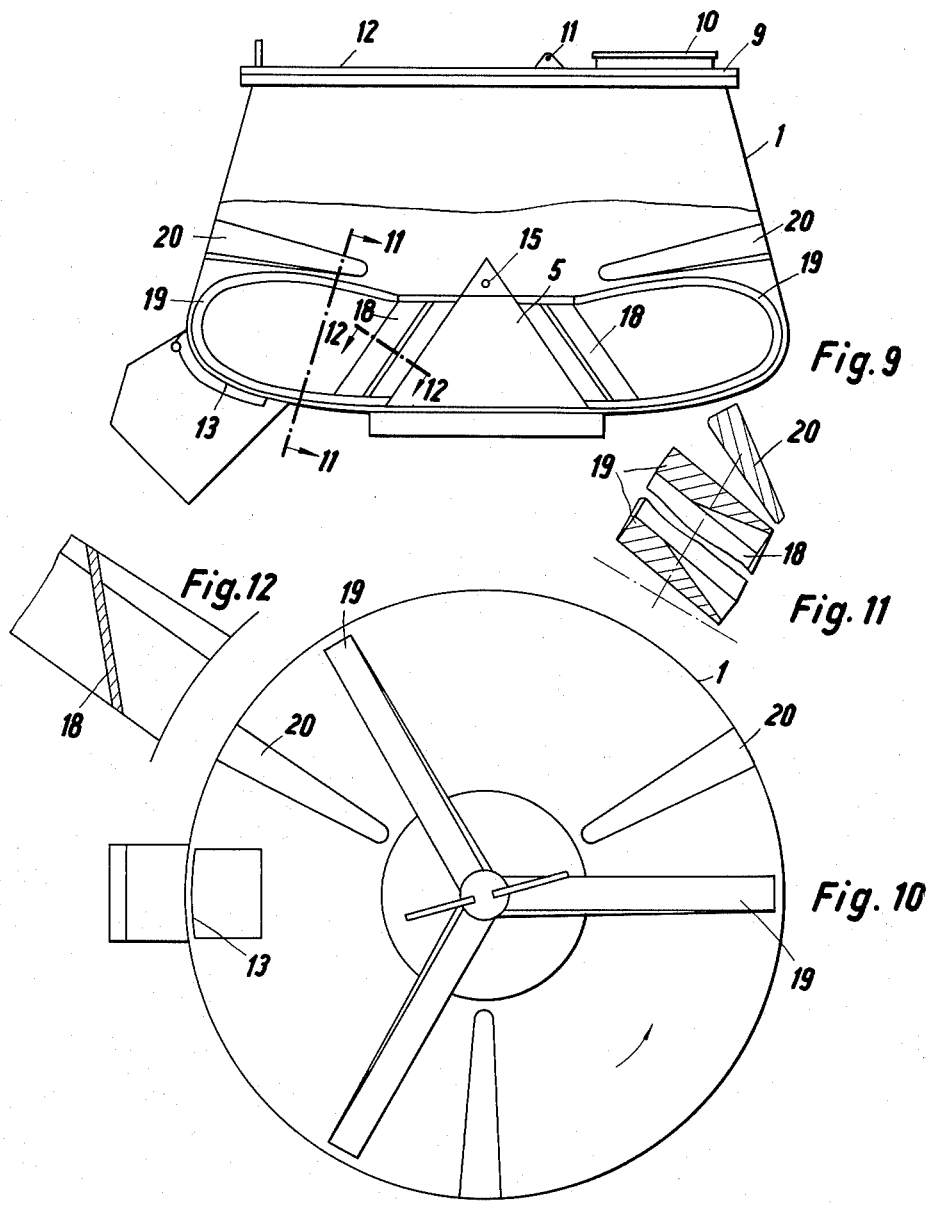

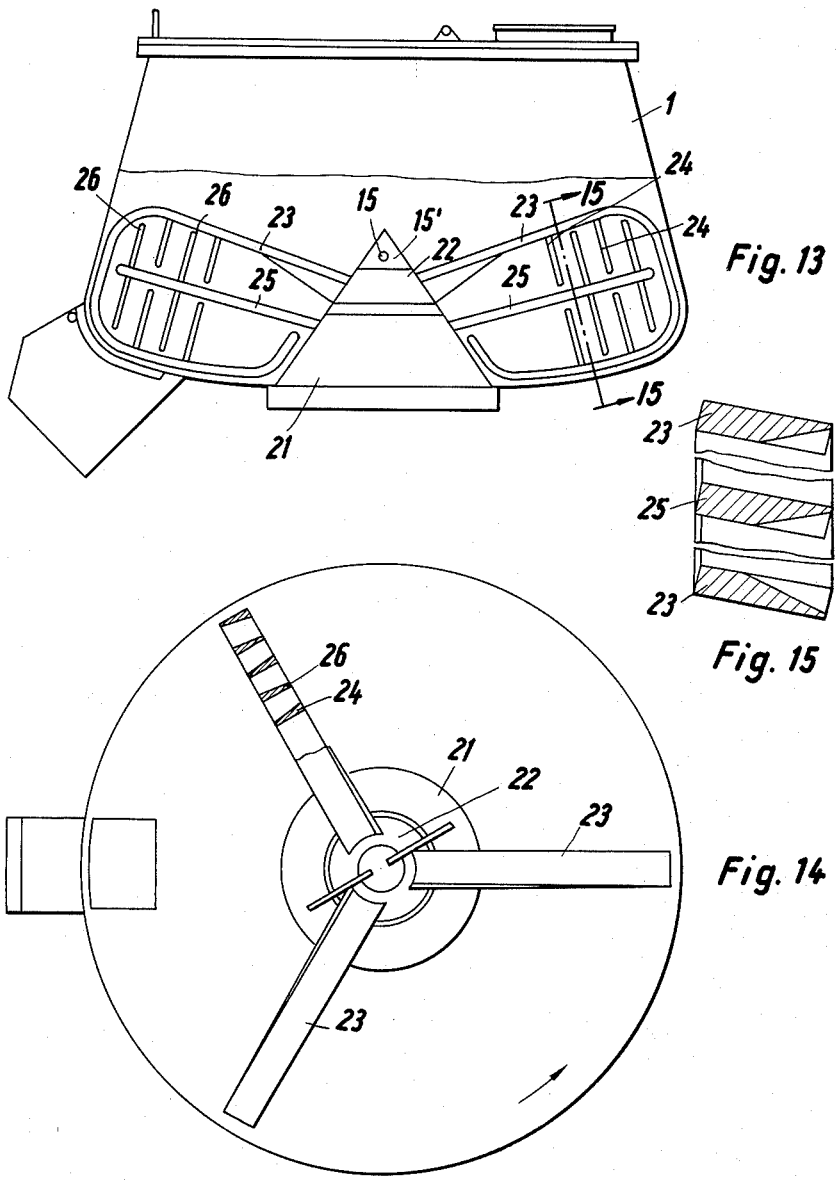

United States Patent Office 3,201,095
Patented Aug. 17, 1965

3,201,095
MIXER
Herbert Erwien and Walther Kaiser, Osnabruck, Germany, assignors to Dierks & Sohne, Osnabruck, Germany, a firm
Filed Aug. 13, 1963, Ser. No. 301,838
Claims priority, application Germany, Feb. 27, 1963, D 40,990; July 20, 1963, D 42,043, D 42,044
22 Claims. (Cl. 259—108)

The invention relates to a mixer, more particularly for mixing and wetting granular or pulverized substances which may or may not contain very reduced amounts of solid or liquid additives, for instance, for cold mixing plastics, for dyeing powder and granulates, for processing chemicals, pill compositions, synthetic resins, casting resins, ceramic compositions, foodstuffs or the like.

It is an object of the invention to provide a simple kind of mixer which provides a high output on reduced driving power, which has a simple kind of mix receptacle and simple mixing tools, in which the heat of friction produced by the mixing tools causes very little heating of the substance being mixed, and whose receptacle and mixing tools can be serviced and cleaned simply and rapidly.

It is another object of the invention to provide very thorough mixing of tough and/or kneadable compositions for mixing and to ensure that delicate products can be thoroughly mixed without their quality being impaired. The mixer is also intended to be of use for beating-up compositions for mixing; it is another object of the invention to enable the mixer to be adapted to various processes with very few means, with very few manual operations and in a very short time.

Mixers are known per se in many constructions and with a very wide variety of mixing tools. The invention starts from a mixer having a stationary receptacle of circular cross-section with a driven shaft extending upwards through the receptacle base, rotating tools being provided on such shaft. According to the invention, the mixing receptacle, which preferably has a curved base, narrows conically upwards; the propeller-like agitating vanes which operate immediately above the base and which extend substantially as far as the receptacle side walls rotate slowly; and a guide cone is disposed in the centre of the receptacle with its apex extending upwards and is secured to the shaft.

Other features of the invention will be disclosed in the following description and claims and illustrated in the drawings wherein:

FIG. 2 is a vertical section taken through the axis of a modified version of mix receptacle illustrated without its base structure; the mixing tools and guide cone correspond basically to those illustrated in FIG. 1 but include additional mixing and guiding members;

FIG. 3 is a horizontal section along line 3—3 through the mix receptacle illustrated in FIG. 2;

FIG. 4 is a section through a mixing vane taken along the line 4—4 of FIG. 3;

FIG. 5 is a simplified side elevation of a variant of this invention with a part of the mixer receptacle wall broken away;

FIG. 6 is a plan view of the mixer illustrated in FIG. 5 with the top removed;

FIG. 7 is a section taken along the line 7—7 in FIG. 6;

FIG. 8 is a section taken along the line 8—8 in FIG. 5;

FIG. 9 is a section similar to FIG. 5 of another embodiment of the invention;

FIG. 10 is a view similar to FIG. 6 of the embodiment illustrated in FIG. 9;

Figure 1:
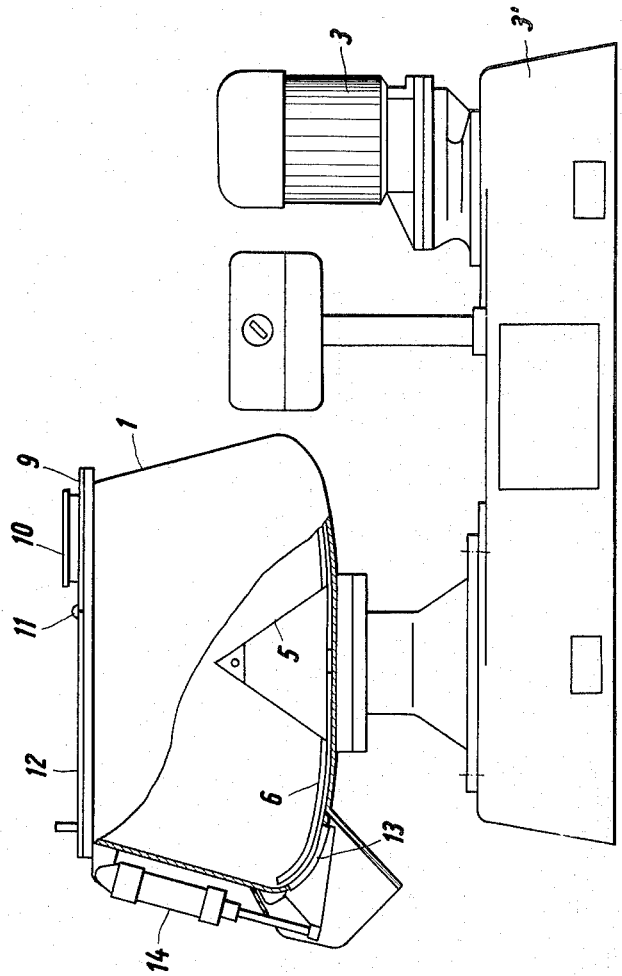
FIG. 1 is a view of the complete mixer including its driving means in side elevation with a part of the mixer receptacle wall broken away in order to illustrate the guide cone and the mixing tools in their simplest form.

FIG. 11 and 12 are sections taken along the line 11—11 and 12—12 respectively of FIG. 9;

FIG. 13 is a view similar to FIGS. 5 and 9 of another embodiment of the invention;

FIG. 14 is a view similar to FIGS. 6 and 10 of the embodiment illustrated in FIG. 13, and FIG. 15 is a section taken along the line 15—15 of FIG. 13.

The mixer comprises a mix receptacle 1 which is in cross section circular and whose base is curved, although the mixer can have a flat base. The receptacle 1 narrows conically upwards and has a driving shaft 2 which extends upwards through the receptacle base and which is driven by a combined driving motor and reduction train 3 via a flat belt or vee belt (not shown). The receptacle 1 and the motor 3 are rigidly secured to the top of a baseplate or the like 3' which receives the belt drive. A dish-shaped member 4 having an axial opening is mounted over the portion of the driving shaft 2 which extends into the receptacle 1 and is secured thereto by means of a nut 15'. The inner ends of the propeller-like vanes 7 are secured to the outer surface of the dish-shaped member 4. The vanes 6 have their surface set to an angle of attack of about 18°, and their ends are bent up to about 10°. A hollow guide cone member 5 is mounted in the center of the receptacle 1 as illustrated in FIG. 1. In a modified version, as illustrated in FIG. 2, the guide cone member 5 is provided with a plurality of vanes 7 (3 are illustrated in FIG. 3) which extend spirally downward from the apex of the cone to the base thereof. A flat view piece 8 twisted in the shape of a corkscrew is mounted on top of the cone 5 and extends axially upwards therefrom so as to form an extension of the vane 7. The top aperture of the receptacle has a stationary cover 9 formed with a closable aperture 10 for automatic charging. There are also charging apertures (not shown) for supplying solid and liquid substances. An upwardly hinging lid 12 is connected by means of a hinge 11 to the cover parts 9 which are welded fast to the top edge of the receptacle 1; the lid 12 is secured in sealing-tight manner to the receptacle aperture through the agency of toggle screws or the like and a ring gasket. The receptacle base is formed with an aperture closable by means of a delivery flap 13 adapted to be opened or closed by a hydraulic or pneumatic or similar actuator 14. The mixer delivers with the flap open and while in operation.

The hollow cone 5 is secured to the end of the shaft 2 by means of a securing nut 15'. At its top end the nut 15' forms a conical apex which extends beyond the opening edge of the hollow cone 5. The conical apex of the nut 15' is formed with a passage 15 adapted to receive a round tommy bar for tightening and slackening the nut 15'. The bottom end thereof is screwed to the end of the shaft 2. The stem of the nut 15', such stem being in the interior, has a driving pin 16 which, once the nut 15' has been released from the end of the shaft 2, moves the cone 5 upwards for removal together with the vanes 6 secured to the cone outside surface.

Constructing the mixing tool as a three-vane device makes the machine operate quietly and leads to optimum mixing. The effect of the cone which covers the core of the tool is that the material which is guided to the centre of the receptacle by the vortex-like flow of the material is guided into the operative zone of the mixing vanes. In the absence of a cone, the material being mixed would stay at the centre of the receptacle and not be affected by the mixing operation. The spiral vanes 7 on the cone outside surface improve the vortex-like flow of the material being mixed, more particularly in cases where the same is light in weight. The corkscrew-like tool 8 which extends along the receptacle axis is provided to ensure that no material stays unmixed in the centre of the material when the receptacle is full.

In the case of a mixer which is shown in FIG. 1 approximately to a scale of 1:10, the mixing tools rotate at a speed of about 10 metres/sec., and the ratio of maximum diameters to height is approximately from 1.8 to 2:1.

Referring now to the embodiment illustrated in FIGS. 5 to 8, a mixing tool comprising preferably three vanes 17, which extend radially and substantially horizontally outwards, is secured between the conical apex 15 of the nut 15' and the top edge of the cone 5; since the nut 15' is tightened on the cone 5, the mixing tool rotates solidly therewith. In their outer parts, the vane ends 17' are bent upwards slightly. Secured to the bottom of each vane 17 is a guiding or deflecting web or the like 18 which is preferably connected to the propeller-like mixing vane 6 below and which extends parallel with the generatrices of the cone 5. As the drawings show, the vanes 17 are disposed perpendicularly above the propeller-like vanes 6, and so the angular intervals between the vanes 7 are the same as the angular intervals between the vanes 6. FIG. 7 shows how the webs 18 having the top vanes 17 are connected to the bottom vanes 6, and FIG. 8 shows how the web 18 is set to an angle of attack against the direction of movement.

In the embodiment illustrated in FIGS. 9 to 12, the vanes are substantially U-shaped flat sheet-metal members 19 which each have one end or arm starting from the bottom edge—and the other end starting from the top edge—of the cone 5 and extending to very near the receptacle side wall; flat guiding or deflecting webs 18 are provided which are set at an angle of attack of about 45° to the direction of movement and which extend parallel with and at a distance from the generated surface of the cone 5 between the arms of the members or vanes 19. Each U-shaped vane 19 has an angle of attack of about 18° over the whole length of its inside, as is apparent more particularly from FIG. 11. Stationary guiding or deflector plates 20 extend radially inwards from the receptacle side wall and are disposed immediately above the rotating mixing vanes 19. The plates 20 are also set at an angle of about 18° in the manner shown in FIG. 11. The webs 18 assist the outwards motion of the substance being mixed, whereas the fixed plates 20 inhibit the flow of the top layer of the substance being mixed and interrupt the flow of product so that the various ingredients of the mix mix gently with one another by the backed-up top layer being drawn in, a wave-like recessing near the fixed plates 20 being produced on the surface of the substance being mixed.

In the embodiment illustrated in FIGS. 13 to 15, the cone is in the form of a stationary conical segment 21 through which the driving shaft extends and which has a rotating conical segment 22 secured to its end. A number, preferably three, of vanes 23 which in shape resemble a U extend star-fashion radially outwards from, and corotate with, the rotating conical segment 22. The vanes 23 extend to near the receptable side wall and their bottom arms move close above the base of the receptacle 1. On the inside of the rotating vanes 23 are plates or webs or the like 24 which extend parallel with one another, opposite one another and in spaced relationship to one another.

Stationary arms 25 extend radially outwards from the stationary conical segment 21 which can be either a separate part secured to the base of the receptacle 1 or a stationary part of such base; in the embodiment illustrated, the arms 25 have on their top and bottom surfaces webs or plates or the like 26 which engage alternately in the gaps between the rotating webs 24. The stationary and rotating webs are at the same distance from one another and are staggered radially relatively to one another, so that the between-web distance operative when the rotating webs pass between the stationary webs is always the same. As will be apparent more particularly from FIG. 15, the flat rotating members have their inside surface set to an angle of attack of about 18° over the whole length, whereas the stationary arms have their surface set to an angle of attack of about 18° towards the receptacle base. The free ends of the rotating vanes are bent parallel to the cone generated surface and rotate at a very reduced distance therefrom. The stationary and/or the rotating webs 26, 24 can be cylindrical rods of flat-sheet-metal members; in the latter case the rotating webs 24 can narrow wedge-fashion in the direction of rotation and the stationary members 26 can narrow wedge-fashion in the direction opposite to the direction of rotation. The members 24 of the rotating vanes 23 and/or the members 26 of the stationary arms 25 can be angularly adjustable, so that movement of the substance being mixed can be reduced or increased in any desired direction.

What we claim is:

1. A mixing machine for mixing and wetting pulverized and granular substances, comprising in combination, stationary receptacle means of circular cross-section having a curved base and conic upwardly extending and narrowing walls, a shaft rotatably and axially mounted in the base of said receptacle and extending upwardly therefrom, mixing tool means being secured to said shaft and being disposed inside said receptacle, said mixing tool means comprising a plurality of vanes which extend radially from said shaft parallel along the base of said receptacle into close proximity of said conic upwardly extending and narrowing walls, a guide cone member centrally mounted in said receptacle on said shaft and extending from the bottom surface of said receptacle means with its apex pointing upwardly, so as to occupy at least a portion of the center region of said receptacle means and electric motor means operatively connected to said shaft for rotating the latter at an outer peripheral speed of said plurality of vanes not exceeding 25 meters per second.

2. The mixing machine as set forth in claim 1, wherein said plurality of vanes consist of three radially extending vane members equiangularly spaced from each other.

3. The mixing machine as set forth in claim 2 wherein said vane members are shaped to have an angle of attack with respect to a mixture in said receptacle of approximately 18° and have their outward end curved upwardly at an angle of approximately 10°.

4. The mixing machine as set forth in claim 2, including three secondary flat vane members (7) equiangularly spaced from each other and perpendicularly mounted on the generated surface of said guide cone member, which extend spirally from the apex of said guide cone member towards the base of said receptacle.

5. The mixing machine as set forth in claim 2, including a corkscrew-like flat part (8) mounted on said guide cone part and extending axially upwardly therefrom.

6. The mixing machine as set forth in claim 2, wherein said guide cone member is hollow, and including a conically shaped bolt member threadably mounted on said shaft, said bolt member securing said cone member to said shaft and forming the apex of said cone member.

7. A mixing machine for mixing and wetting pulverized and granular substances, comprising in combination, stationary receptacle means of circular cross-section having a curved base and conic upwardly extending walls, a shaft rotatably and axially mounted in the base of said receptacle and extending upwardly therefrom, mixing tool means being secured to said shaft and being disposed inside said receptacle, said mixing tool means comprising a guide cone member and a plurality of pairs of vanes which extend radially from said guide cone member substantially parallelly to the base of said receptacle, each pair of said plurality of pairs of vanes including an upper vane member radially extending from the upper part of said guide cone member and a lower vane member extending radially from the lower part of said guide cone member parallel along the base of said receptacle into close proximity of said conic upwardly extending walls, and a web member spaced from said guide cone member joining said upper and lower vane members, and electric motor means operatively connected to said shaft for rotating the latter.

8. The mixing machine as set forth in claim 7 wherein said plurality of pairs of vanes consist of three pairs of upper and lower vane members equiangularly spaced from each other.

9. The mixing machine as set forth in claim 7, wherein said upper vane members have a small upward set in their outer region.

10. The mixing machine as set forth in claim 7, wherein said web members are disposed parallel to the generatrices of said guide cone member.

11. The mixing machine as set forth in claim 10, wherein said web members are flat and are arranged at an angle of attack of about 45° with respect to their direction of movement and with respect to the mix in said receptacle.

12. A mixing machine for mixing and wetting pulverized and granular substances, comprising in combination, stationary receptacle means of circular cross-section having a curved base and conic upwardly extending walls, a shaft rotatably and axially mounted in the base of said receptacle and extending upwardly therefrom, mixing tool means being secured to said shaft and being disposed inside said receptacle, said mixing tool means comprising a guide cone member, a plurality of U-shaped vane members secured to said guide cone member, said U-shaped vane members having one lower leg secured to the lower part of said guide cone member and the other upper leg secured to the upper part of said guide cone member, said U-shaped vane members extending radially from said guide cone member toward said conic upwardly extending walls, a plurality of stationary deflector plates secured to said conic upwardly extending walls immediately above said U-shaped vane members and extending radially inward over said U-shaped vane members, and electric motor means operatively connected to said shaft for rotating the latter.

13. The mixing machine as set forth in claim 12, including a guiding plate, spaced from said guide cone member and parallel to the generated surface thereof, joining the upper and lower legs of each U-shaped vane member of said plurality of vane members.

14. The mixing machine as set forth in claim 13, wherein each of said guiding plates are flat and are arranged at an angle of attack of about 45° with respect to their direction of rotary movement and with respect to the mix in said receptacle.

15. The mixing machine as set forth in claim 13, wherein said U-shaped vane members and said stationary deflector plates are shaped to have an angle of attack of about 18° with respect to the direction of rotary movement of said U-shaped vane members.

16. A mixing machine for mixing and wetting pulverized and granular substances, comprising in combination, stationary receptacle means of circular cross-section having a curved base and conic upwardly extending walls, a shaft rotatably and axially mounted in the base of said receptacle means and extending upwardly therefrom, a stationary frusto-conical member axially projecting from said base, mixing tool means being secured to said shaft and being disposed inside said receptacle, said mixing tool means comprising a guide cone member which is axially mounted on said stationary frusto-conical member so as to form the apex thereof, a plurality of U-shaped vane members secured with their upper legs to said guide cone member and axially extending therefrom, a plurality of stationary members secured to said stationary frusto-conical member and radially projecting therefrom between the generated convolute surface of said U-shaped vane members when the latter are located, a plurality of projections extending respectively from said U-shaped and stationary member in juxtaposed relationship to each other, and electric motor means operatively connected to said shaft for rotating the latter.

17. The mixing machine as set forth in claim 16, wherein the free legs of said U-shaped vane members extend parallel to the generated surface of said frusto-conical stationary member in close proximity thereto.

18. The mixing machine as set forth in claim 16, wherein said U-shaped vane members are flat and are shaped and arranged to form an angle of attack about 18° with respect to their direction of rotary movement and with respect to the mix in said receptacle.

19. The mixing machine as set forth in claim 16, wherein said stationary members are flat and are shaped and arranged to form an angle of attack of about 18° with respect to the direction of rotary movement of the mix in said receptacle.

20. The mixing machine as set forth in claim 16, wherein said plurality of projections are flat shaped bars.

21. The mixing machine as set forth in claim 20, wherein the projections of said U-shaped members are wedge-shaped with the apex of the wedge facing in the direction of rotation of said U-shaped members, and wherein the projections of said stationary members are wedge-shaped with the apex of the wedge facing in the direction opposite to the direction of rotation of said U-shaped members.

22. A mixing machine for mixing and wetting pulverized and granular substances, comprising in combination, stationary receptacle means of circular cross-section having a curved base and conic upwardly extending and narrowing walls, a shaft rotatably and axially mounted in the base of said receptacle and extending upwardly therefrom, mixing tool means being secured to said shaft and being disposed inside said receptacle, said mixing tool means comprising a plurality of vanes which extend radially from said shaft parallel along the base of said receptacle into close proximity of said conic upwardly extending and narrowing walls, a guide cone member centrally mounted in said receptacle on said shaft and extending from the bottom surface of said receptacle means with its apex upwardly so as to occupy at least a portion of the center region of said receptacle means, and electric motor means operatively connected to said shaft for rotating the latter at an outer peripheral speed of said plurality of vanes of about 10 meters per second.

References Cited by the Examiner

UNITED STATES PATENTS

| 1,779,571 | 10/30 | Ullgren | 259—108 X |
| 1,987,388 | 1/35 | Cretors | 259—44 X |

FOREIGN PATENTS

| 122,542 | 4/31 | Austria. |
| 459,237 | 1/37 | Great Britain. |

CHARLES A. WILLMUTH, *Primary Examiner.*